April 5, 1932.  M. ZAIGER ET AL  1,852,599
WINDSHIELD HEATER
Filed Feb. 18, 1931
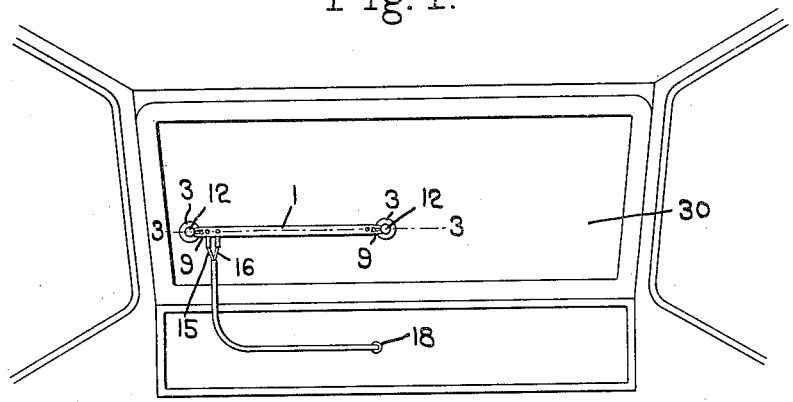
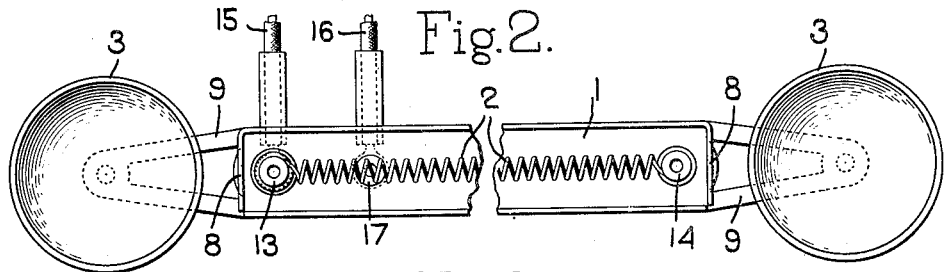
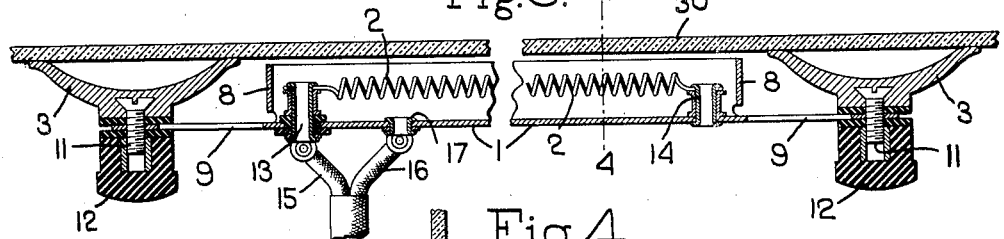
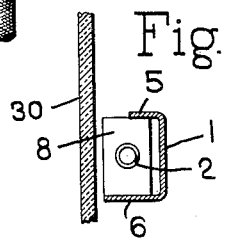
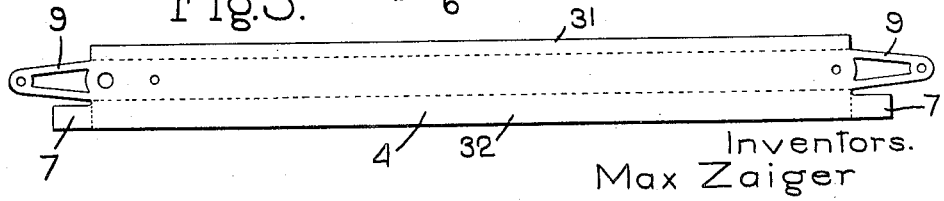
Inventors.
Max Zaiger
Louis Zaiger
by Heard Smith & Tennant.
Attys.

Patented Apr. 5, 1932

1,852,599

UNITED STATES PATENT OFFICE

MAX ZAIGER, OF SWAMPSCOTT, AND LOUIS ZAIGER, OF LYNN, MASSACHUSETTS

WINDSHIELD HEATER

Application filed February 16, 1931. Serial No. 516,602.

This invention relates to an electric windshield heater for use in automobiles for the purpose of heating the windshield sufficiently to prevent ice accumulating thereon.

An object of the invention is to provide a novel windshield heater which can be inexpensively made, which when installed will be effective in preventing the ice from freezing on the windshield but will not obstruct the view of the driver and which can be readily put in position or removed without the use of any tools.

In order to give an understanding of the invention we have illustrated in the drawings a selected embodiment thereof which will now be described after which the novel features will be pointed out in the appended claims.

Fig. 1 is a fragmentary perspective view showing the inside of the windshield of an automobile with our heater applied thereto;

Fig. 2 is an inside view of the heater or the reverse view from that shown in Fig. 1;

Fig. 3 is an enlarged section on the line 3—3, Fig. 1;

Fig. 4 is a section on the line 4—4, Fig. 3;

Fig. 5 is a view of the blank from which the body of the heater may be made.

Our improved windshield heater comprises a body member 1 having a general channel shape in cross section and which has relatively small transverse dimensions in both directions, a heating coil 2 located within the channel-shaped body and means, such as suction cups 3, for securing said heater to the windshield 30. The relatively narrow transverse dimension of the body provides a heater which when in place does not interfere appreciably with the vision of the driver of the automobile.

It is expected that the heater will be applied to the inside of the windshield at a point just below the normal line of vision of the operator.

The heating coil is connected to the battery of the automobile in some suitable way so as to be heated therefrom and part of the heat which is generated by the coil will be radiated directly to the windshield and part of the heat will be reflected onto the windshield from the interior of the body member, the interior face of the latter preferably having heat-reflecting properties for this purpose.

The body member 1 may be made in various ways without departing from the invention. In the illustrated embodiment said body portion is formed from a blank 4 of sheet metal, such as shown in Fig. 5, and in making the body portion the edges 31 and 32 of the blank are bent up to form the legs 5 and 6 of the body portion and in doing this the portions 7 of the blank are bent transversely to form the ends 8 of the body. The body member is also formed with the extensions 9 to which the suction cups 3 are attached. As herein shown each suction cup, which, of course, is made of rubber or of some similar flexible material, has a screw-threaded metal stem 11 extending therefrom, which stem extends through an opening in the end of the extension 9, and a clamping nut 12 is screw threaded to the stem thereby clamping the suction cup to the extension 9. These clamping nuts are preferably of insulating material and they provide handles or knobs by which the heater may be manipulated in applying it to or removing it from the windshield.

In forming the body member 1 from the blank 4 the edges will be bent so that the upper leg 5 of the body will be slightly shorter than the lower leg 6. Furthermore, the suction cups are so constructed that when the device is applied to the windshield the edge of the lower leg 6 will come quite close to the windshield glass although preferably not in contact therewith. With this construction there will be a wider space between the edge of the upper leg 5 of the body and the windshield than between the edge of the lower leg 6 and the windshield, as seen in Fig. 4.

This construction has two advantages. The heat by which the windshield is heated is partly radiant heat from the heated coil and partly heat of convection due to the rising current of heated air.

It will be noted that the edge of the upper leg is in substantially the vertical plane of the axis of the coil. Because of this fact such leg will not interfere with the radiation of heat from the heated coil upwardly over a considerable area of the windshield above the body 1. The wider lower leg 6, however, will prevent heat being radiated downwardly against the windshield below the body 1 and will serve to reflect the heat back onto the windshield.

Moreover, this wider space between the edge of the upper leg 5 and the windshield allows a free movement of the heated air upwardly along the windshield and when the heater is in operation, therefore, there will be established an upward current of air which enters between the lower leg 6 of the body 1 and the windshield and becomes heated by the coil and then flows upwardly over the windshield thereby heating a considerable portion of the windshield above the body 1. The portion of the windshield above the body 1 and which is in the line of vision of the driver of the automobile is thus heated partly by the radiant heat generated by the heated coil 2 and partly by the heat of convection.

The coil 2 may be connected to the battery in any appropriate way. As herein shown one end of the coil is fastened to a stud 13 which is anchored in the body 1 but is insulated therefrom while the other end is connected to a stud 14 that is also anchored in said body but not insulated therefrom.

The two wires of the heating circuit are indicated at 15 and 16, the wire 15 being attached to the insulated stud 13 and the other wire being secured directly to the body 1 in some suitable way, as by means of a tubular rivet 17.

One of these wires may be grounded on the frame of the automobile and the other will lead to the battery or to a suitable terminal which is connected to the battery. It will be understood, of course, that any appropriate switch may be placed in the circuit, of which the circuit wires 15, 16 forms a part in order that the operator may close or open the heater circuit at pleasure, or the wires 15, 16 may be connected to a plug 18 which can be plugged into the socket of the dash lamp as shown in Fig. 1.

We claim:

1. An electric heater for windshields of automobiles comprising an elongated relatively narrow body channel shape in cross section, a heating coil situated within said body and extending longitudinally thereof, means including suction cups at the ends of the body for attaching the body to the windshield, and circuit connections for connecting said coil to a source of electrical energy, said attaching means being constructed to slightly space the edge of the lower leg of said body from the windshield, and the upper leg being narrower than the lower leg so that its edge is spaced a greater distance from the windshield than the edge of the lower leg, whereby the lower leg prevents heat radiation from the heated coil downwardly against the portion of the windshield below said body while the upper leg permits free radiation against the portion of the windshield above said body.

2. An electric heater for windshields of automobiles comprising an elongated relatively narrow body channel-shaped in cross section made from an elongated blank having two extensions at each end, said blank being bent along two parallel lines extending longitudinally thereof to form a channel-shaped body with one leg of the channel shorter than the other, one of the extensions at each end being bent to form a closure for the end of the body, two terminals secured to the body, one adjacent each end thereof, said terminals projecting inwardly from the back and being located within the body, one of said terminals being insulated from the body, a heating coil extending from one terminal to the other and situated within said body, a suction cup secured to the other extension at each end of the body and by which the heater may be attached to a windshield with the longer leg of the body on the under side and the shorter leg on the upper side, and two circuit wires, one connected to the insulated terminal and the other to the body at a point adjacent thereto, the wider lower leg of the channel-shaped body preventing heat radiation from the heated coil downwardly against the portion of the windshield below the body while the shorter upper leg of the body portion permits free radiation of heat from the heated coil upwardly against the portion of the windshield above the body.

In testimony whereof, we have signed our names to this specification.

MAX ZAIGER.
LOUIS ZAIGER.